United States Patent [19]
Kobayashi et al.

[11] 4,426,666
[45] Jan. 17, 1984

[54] VIDEO SIGNAL RECORDING/REPRODUCING APPARATUS

[75] Inventors: Masaaki Kobayashi, Kawanishi; Minoru Kohda, Yawata, both of Japan

[73] Assignees: Matsushita Electric Industrial Co., Ltd., Osaka, Japan; Matsushita Electric Industrial Co., Ltd., Osaka, Japan

[21] Appl. No.: 308,857

[22] Filed: Oct. 5, 1981

[30] Foreign Application Priority Data

Oct. 3, 1980 [JP] Japan ................................ 55-138952
Oct. 3, 1980 [JP] Japan ................................ 55-138953

[51] Int. Cl.³ ............................................. H04N 5/93
[52] U.S. Cl. ................................... 360/10.3; 360/64; 360/38.1; 358/312
[58] Field of Search ................... 360/10.3, 10.1, 21, 360/122, 64, 7, 11.1, 33.1, 38.1, 36.1; 369/60; 358/312, 314

[56] References Cited

U.S. PATENT DOCUMENTS 4,005,476  1/1977  Dishopp .......................... 360/36.1
4,197,562  4/1980  Kikuya ............................... 360/64
4,293,880 10/1981  Tsukada ............................. 360/64

Primary Examiner—Alan Faber
Attorney, Agent, or Firm—Wenderoth, Lind & Ponack; Wenderoth, Lind & Ponack

[57] ABSTRACT

A video signal recording/reproducing apparatus has two main rotary heads, two sub-rotary heads, and a recorded video tape. One main rotary head M1 has a +6° azimuth angle and one sub-rotary head S1 has a −6° azimuth angle. The sub-rotary head S1 is mounted near the main rotary head M1. For example, the distance between the main rotary head M1 and the sub-rotary head S1 corresponds to two horizontal sync signal intervals of a video signal. Main rotary head M2 has a −6° azimuth angle and sub-rotary head S2 has a +6° azimuth angle. The distance between the main rotary head M2 and the sub-rotary head S2 is the same as that between M1 and S1. The main rotary head M2 is located at a position opposite to the main rotary head M1 on a rotary head disk. In the fast motion reproduction mode, the main rotary head M1 and the sub-rotary head S1 scan recorded video tracks on the video tape. The reproduced signal of the main rotary head M1 has several lower or zero level positions in one field. The reproduced signal of the sub-rotary head S1 is selectively substituted for the lower or zero level positions of the reproduced signal of the main rotary head M1.

13 Claims, 14 Drawing Figures

VIDEO SIGNAL RECORDING/REPRODUCING APPARATUS

BACKGROUND OF THE INVENTION

This invention generally relates to a video tape recorder/reproducer which reproduces pictures having no noise bars or reduced noise bars in a so-called trick motion reproduction mode such as a fast motion reproduction mode or a fast reverse motion reproduction mode or a slow motion reproduction mode or a still reproduction mode.

Recently, trick motion mode reproduction has been demanded in video tape recorder/reproducers. In the still mode or slow motion mode, some methods have been proposed so as to not cause noise bars on the reproduced picture. But, in the fast motion mode or fast reverse motion mode, no methods have been proposed for preventing the noise bars from being produced.

SUMMARY OF THE INVENTION

Accordingly, an object of this invention is to provide a reproduced picture having reduced noise bars or no noise bars in the fast motion mode or the fast reverse motion mode of a video tape recorder/reproducer.

Another object of this invention is to provide a reproduced picture having reduced noise bars or no noise bars in the slow motion mode or the slow reverse motion mode of a video tape recorder/reproducer.

A video tape recording/reproducing apparatus in accordance with the present invention has a first main rotary head and a second main rotary head, wherein the azimuth angles of the main rotary heads are different from each other, and wherein a magnetic tape is driven during reproduction at a speed which is different from the speed used during recording, the apparatus is provided with a first sub-rotary head which is fixed near the first main rotary head and which reproduces a signal for compensating for lower level signal portions of a reproduced signal from the first main rotary head and is also provided with a second sub-rotary head which is fixed near the second main rotary head and which reproduces a signal for compensating for lower level signal portions of a signal reproduced by the second main rotary head.

DESCRIPTION OF THE PREFERRED EMBODIMENT

Hereinafter, a preferred embodiment of this invention will be described.

Figure 1:
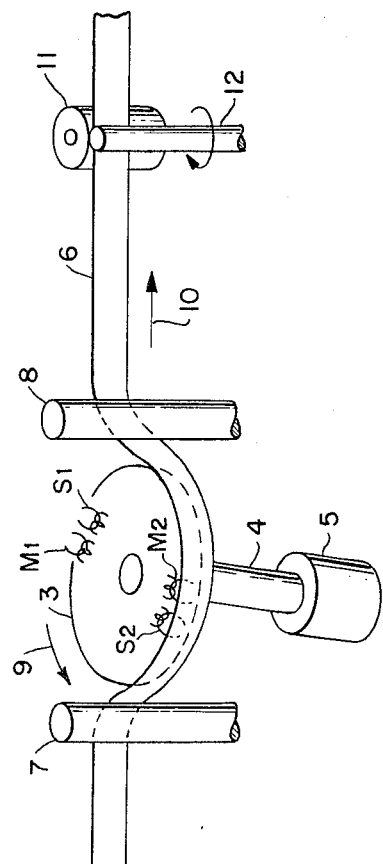
FIG. 1 is a principal part of a video tape recorder/reproducer of this invention.
Figure 2:
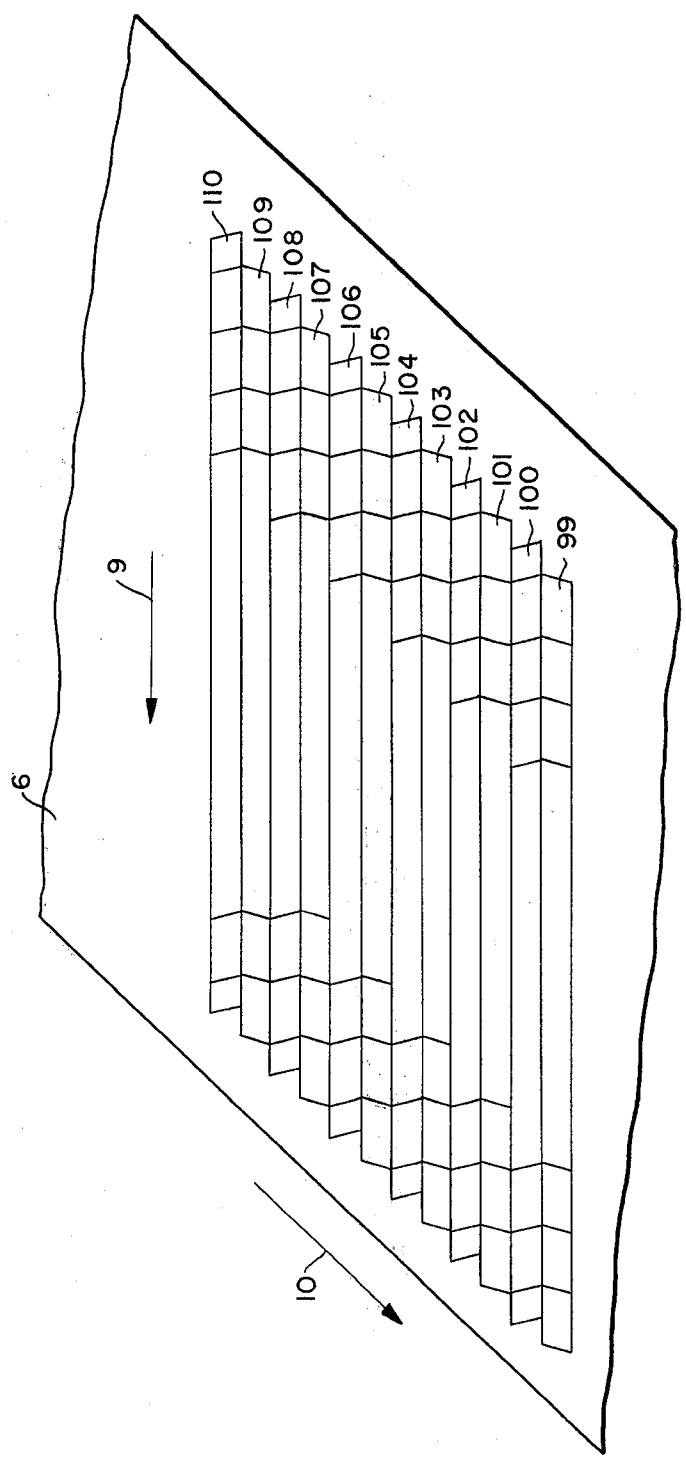
FIG. 2 is a recorded pattern on a magnetic tape.

FIG. 1 shows the configuration of main rotary heads and sub-rotary heads of this invention. FIG. 2 shows an example of a track pattern which is recorded on a magnetic tape. One main rotary head M1 has a +6° azimuth angle. One sub-rotary head S1 has a −6° azimuth angle. The other main rotary head M2 has a −6° azimuth angle. The other sub-rotary head S2 has a +6° azimuth angle. These main heads are fixed on a rotary disk 3 and are separated by 180° from each other with respect to the center of the rotary disk 3. The main rotary heads M1 and M2 and the sub-rotary heads S1 and S2 are located on the same rotating plane of the rotary disk 3. The sub-rotary head S1 is fixed near the main rotary head M1. For example, the distance between them is equivalent to two horizontal sync intervals on a magnetic tape 6.

The rotary disk 3 is driven by a motor 5 through a rotary shaft 4. The rotating direction is shown by an arrow 9. The rotating rate of the rotary disk 4 is 1800 r.p.m. The magnetic tape 6 is driven to pass through guide posts 7 and 8 by a pinch roller 11 and a capstain 12. The magnetic tape 6 is wound around the rotary disk 3 for more than 180°.

In FIG. 2, video tracks 99, 101, 103, 105, 107 and 109 are recorded by the video head whose azimuth angle is +6°. Video tracks 100, 102, 104, 106, 108 and 110 are recorded by the other video head whose azimuth angle is −6°. The slanted lines of these tracks indicate the recorded positions of horizontal sync signals. The angle of a slanted line shows the azimuth angle of the recording head. The slanted lines are omitted at the center part of the field.

Figure 3:
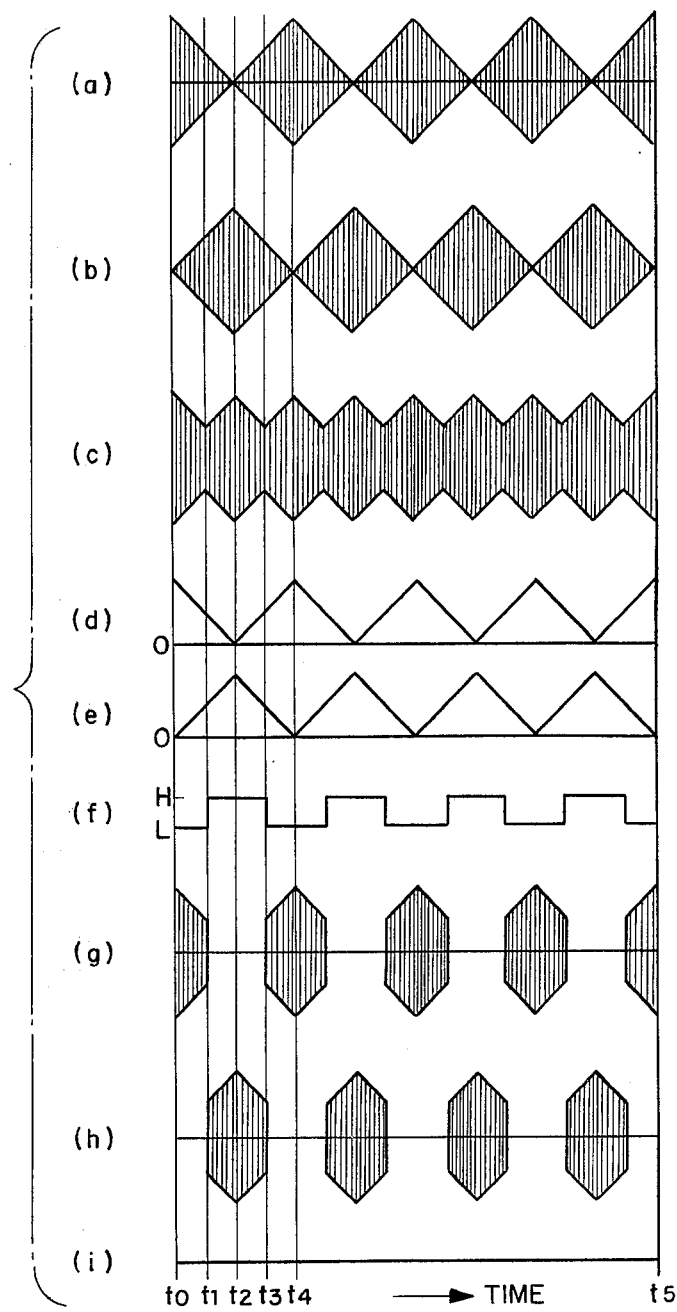
FIGS. 3 (a)-(i) show signals appearing at various points in FIG. 4.

The track pattern shown in FIG. 2 is the state of normal speed reproduction in which the reproducing speed is the same as the recording speed. In the normal speed reproduction mode, if the main rotary video head M1 scans the start point of the track 101, the head scans the end point of track 101 at the end of one field. In the fast motion mode, for example, the nine times normal speed mode, if the main rotary head M1 scans the start point of the track 101, the head scans the end point of the track 101 at the end of one field. As the sub-rotary head S1 is fixed near the main rotary head M1 and on the same rotating plane, the sub-rotary head S1 scans approximately the same trace which is scanned by the main rotary head M1. In the nine times normal speed mode, since the main rotary head M1 has a +6° azimuth angle, an output signal as shown in FIG. 3(a) is obtained by the main rotary head M1. Since the sub-rotary head S1 has a −6° azimuth angle, an output signal as shown in FIG. 3(b) is obtained by the sub-rotary head S1.

The output signals of rotary heads in a conventional video tape recorder/reproducer are formed from a frequency modulated luminance signal whose carrier frequency is about 3.9 MHz and a down converted chrominance signal whose frequency is about 629 KHz.

FIG. 3(i) shows a time scale in which "$t_0$" is a beginning timing of a field and "$t_5$" is an end timing of the field.

In the fast motion reproduction mode, the conventional video tape recorder/reproducer reproduces pictures with several noise bars which are caused by the zero signal level of the rotary heads. Occurrance of these noise bars is a defect of a conventional video tape recorder/reproducer.

In this invention, the lower signal level periods of the main rotary head M1 are compensated by the higher signal level periods of the sub-rotary head S1 as shown in FIG. 3(c). Consequently, the resultant signal shown in FIG. 3(c) does not have any lower level periods, so that the reproduced picture has no noise bars.

Figure 4:
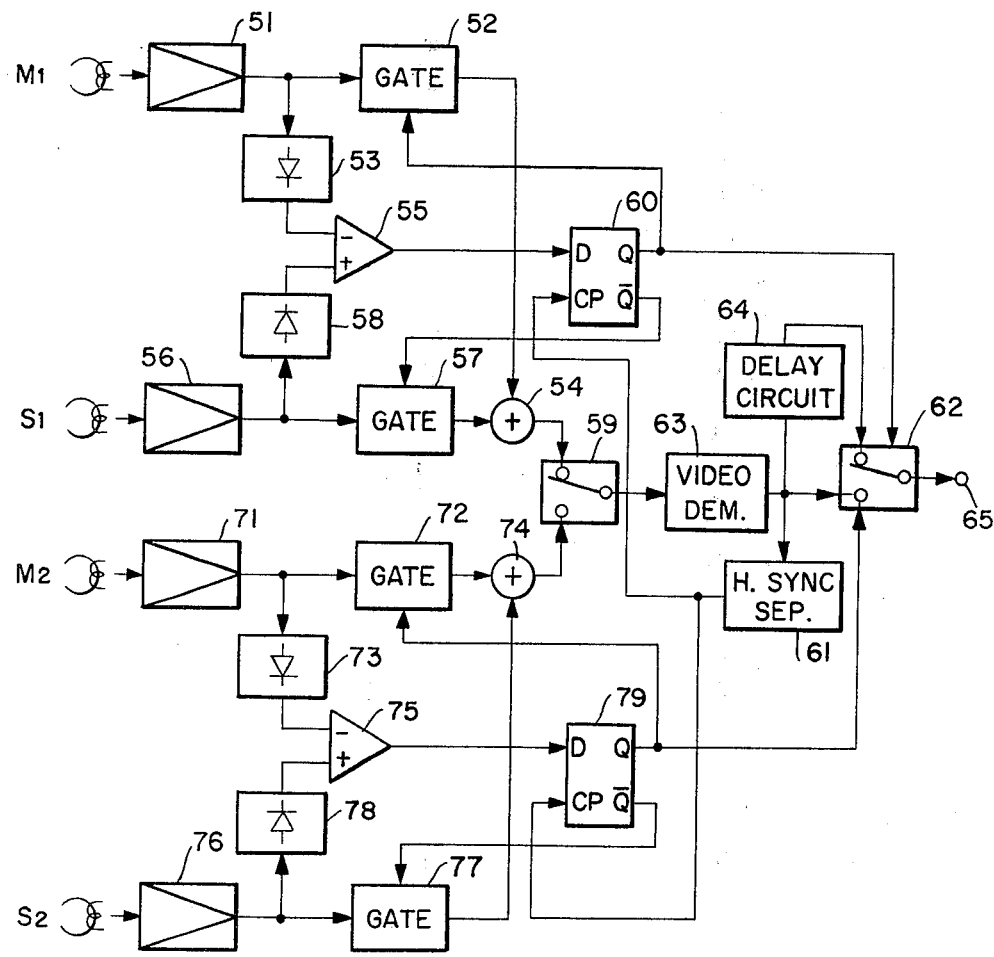
FIG. 4 is a block diagram of an embodiment of a video tape recorder/reproducer of this invention.

FIG. 4 shows a block diagram of this invention. The output signal of the main rotary head M1 is amplified by a pre-amplifier 51 and is then supplied to a gate circuit 52 and to a amplitude detector 53. An output signal of the gate circuit 52 is supplied to an adder 54. An output signal of the amplitude detector 53 is supplied to a negative input terminal of a comparator 55. The output signal of the sub-rotary head S1 is amplified by a pre-amplifier 56 and is then supplied to a gate circuit 57 and to an amplitude detector 58. An output signal of the gate circuit 57 is supplied to the adder 54. An output signal of the adder 54 is supplied to a switch circuit 59. The switch circuit 59 is a commonly used switch circuit (as also used in prior art video tape recorders) for changing over, (on a field by field basis), reproduced signals from rotary heads which are separated by 180° from each other on the rotary disk. An output signal of the amplitude detector 58 is supplied to a positive input terminal of the comparator 55. An output signal of the comparator 55 is supplied to a D input terminal of a D type flip-flop 60. An output signal of a horizontal sync separator 61 is supplied to a CP (clock pulse) terminal of the D flip-flop 60. An output signal of a Q terminal of the D flip-flop 60 is supplied to a control terminal of the gate circuit 52 and a control terminal of a switch circuit 62. An output signal of a $\bar{Q}$ terminal of the D flip-flop 60 is supplied to a control terminal of the gate circuit 57. The output signals of the main rotary head M2 and the sub-rotary head S2 are processed by pre-amplifiers 71 and 76, gate circuits 72 and 77, amplitude detectors 73 and 78, a comparator 75, a D type flip-flop 79 and an adder 74 in the same manner as for the output signals of the main rotary head M1 and the sub-rotary head S1 as described above. An output signal of the adder 74 is supplied to the switch circuit 59. An output signal of the switch circuit 59 is supplied to the horizontal sync separator 61, the switch circuit 62 and a delay circuit 64 through a video signal demodulator 63. An output signal of the switch circuit 62 is supplied to an output terminal 65.

As an example, the pre-amplifier 51 supplies the signal shown in FIG. 3(a), and the amplitude detector 53 supplies the envelope signal shown in FIG. 3(d). The amplitude detector 53 is comprises a conventional diode detector. Similarly, the pre-amplifier 56 supplies the signal shown in FIG. 3(b), and the amplitude detector 58 supplies the envelope signal shown in FIG. 3(e). The construction of the amplitude detector 58 is the same as that of the amplitude detector 53. These envelope signals are compared by the comparator 55. The resultant signal is supplied to the D type flip-flop 60. Furthermore, since demodulated horizontal sync signals (described later) are supplied to the CP terminal, a signal (which is shown in FIG. 3(f) and is synchronized with the horizontal sync signal) is obtained at the Q terminal of the D flip-flop 60.

When the level of the output signal from the sub-rotary head S1 is larger than that of the output signal of the main rotary head M1, the comparator 55 outputs a High ("H") level signal as shown in FIG. 3(f). When the level of the output signal from the sub-rotary head S1 is smaller than that of the output signal of the main rotary head M1, the comparator 55 outputs a Low ("L") level signal as shown in FIG. 3(f). The $\bar{Q}$ terminal outputs an inverted polarity signal. When the Q terminal level is an "L" level, the gate circuit 52 passes the signal which is a high level portion of the output signal of the rotary head M1 as shown in FIG. 3(g). When the $\bar{Q}$ terminal level is an "L" level, the gate circuit 57 passes the signal which is a high level portion of the output signal of the rotary head S1, as shown in FIG. 3(h). The gate circuits 52 and 57 are conventional analog gate circuits which comprise field effect transistors (FET).

Signals shown in FIGS. 3(g) and 3(h) are added by the adder 54. As the result, the lower signal level position of the main rotary head M1 is compensated for by the higher signal level position of the sub-rotary head S1. Since the compensating timing is synchronized with the horizontal sync signal using the D type flip-flop 60, the switching noise does not appear on the picture. At this field, the switch circuit 59 passes the output signal of the adder 54 to the video signal demodulator 63. The video signal demodulator 63 comprises a luminance signal demodulator and a chrominance signal demodulator (both are well known). The luminance signal demodulator demodulates frequency modulated luminance signals. The chrominance signal demodulator converts down-converted chrominance signals to carrier chrominance signals. The demodulated video signal is supplied to the horizontal sync separator 61, the delay circuit 64 and the switch circuit 62. The horizontal sync separator 61 separates a horizontal sync signal. The delay circuit 64 delays the demodulated video signal. The delay time is the differential time between the sub-rotary head S1 and the main rotary head M1. In this explanation, the differential time corresponds to two horizontal scanning times. A glass delay line or a semiconductor delay line such as a charge coupled device can be used.

A semiconductor delay line can exactly adjust the differential time of the heads. The main rotary head M1 scans two horizontal scanning times before the sub-rotary head S1. When the output signal of the Q terminal of the D type flip-flop 60 is an "H" level, the switch circuit 62 connects the output 65 to the delay circuit 64. When the output signal of the Q terminal of the D type flip-flop 60 is an "L" level, the movable strip of the switch circuit 62 connects the output 65 to the video signal demodulator 63. By this switching operation, the differential time is cancelled.

At the next field, the output signal of the main rotary head M2 and the output signal of the sub-rotary head S2 are processed in the same manner.

As described above, by using the sub-rotary heads whose azimuth angle and rotating plane are properly selected, the lower signal level positions are compensated for, so that no noise bar appears in the picture.

In the fast reverse motion reproduction mode, there are lower signal level positions of the main rotary head M1. The lower signal level positions of the main rotary head M1 are compensated for by the higher signal level positions of the sub-rotary head S1 in the same manner as above. As a result, no noise bar appears in the picture.

As described above, the switching timings of the main rotary head M1 and the sub-rotary head S1 are synchronized with the reproduced horizontal sync signal. As a result, the switching noise does not appear on the picture. If the appearance of the switching noise is allowable, the D type flip-flops 60 and 79 are not necessary.

If the rotary plane of the sub-rotary heads S1 and S2 differ by an even number of track pitches from the rotary plane of the main rotary heads M1 and M2, noise bars on the picture can also be eliminated in the same way as described above. In this description, a recorded track width is equal to the width of the heads M1, M2, S1 and S2. If the width of the sub-rotary head S1 or S2 is wider than the width of the main rotary head M1 or M2, the noise bars on the picture can also be eliminated.

Figure 5:
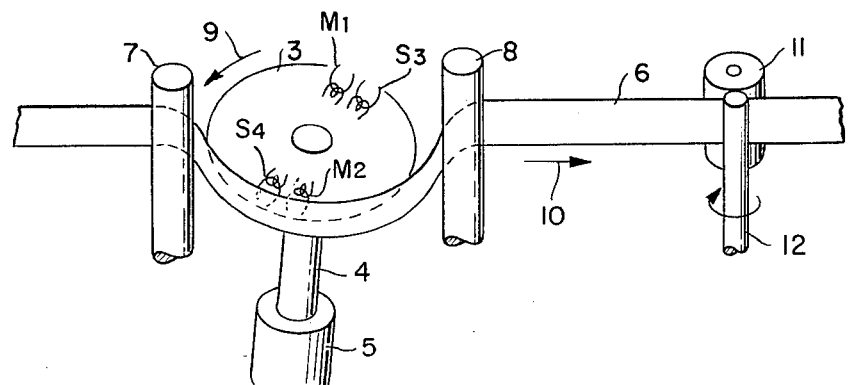
FIG. 5 is a principal part of another video tape recorder/reproducer of this invention.
Figure 6:
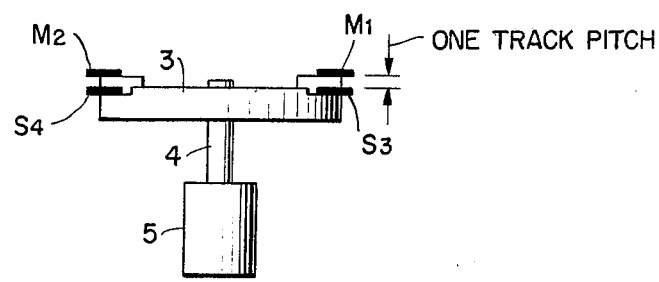
FIG. 6 shows an arrangement of the rotary heads in FIG. 5.

FIG. 5 and FIG. 6 show another combination of the sub-rotary heads. A sub-rotary head S3 has a +6° azimuth angle, and a sub-rotary head S4 has a −6° azimuth angle. The rotary plane of the sub-rotary heads S3 and S4 is one track pitch lower than the rotary plane of the main rotary heads M1 and M2. The sub-rotary head S3 is fixed near the main rotary head M1. For example, the distance between them is equivalent to two horizontal sync intervals on the magnetic tape 6. The sub-rotary head S4 is fixed near the main rotary head M2. For example, the distance between them is equivalent to two horizontal sync intervals.

In the fast motion reproduction mode, the reproduced signal by the sub-rotary head S3 is nearly equal to the signal shown in FIG. 3(b). By using the same circuit as shown in FIG. 4, the lower signal level positions of the main rotary heads M1 are compensated for by the higher signal level positions of the sub-rotary head S3. As a result, no noise bar appears on the picture. If the rotary plane of the sub-rotary heads S3 and S4 differ by an odd number of track pitches from the rotary plane of the main rotary heads M1 and M2, approximately the same effect will be obtained.

What is claimed is:

1. A video tape recording/reproducing apparatus comprising:
   a first main rotary head and a second main rotary head, said first and second main rotary heads having azimuth angles which are different from each other;
   a first sub-rotary head fixed near said first main rotary head;
   a second sub-rotary head fixed near said second main rotary head;
   a first amplitude detector for detecting the amplitude of a reproduced signal from said first main rotary head;
   a second amplitude detector for detecting the amplitude of a reproduced signal from said first sub-rotary head;
   a first comparator for comparing the signal level of an output signal from said first amplitude detector with the signal level of an output signal from said second amplitude detector;
   a first gate circuit for gating said output signal from said first amplitude detector in accordance with an output signal from said first comparator;
   a second gate circuit for gating said output signal from said second amplitude detector in accordance with said output signal from said first comparator;
   a first adder for adding an output signal from said first gate circuit to an output signal from said second gate circuit;
   a third amplitude detector for detecting the amplitude of an output signal from said second main rotary head;
   a fourth amplitude detector for detecting the amplitude of an output signal from said second sub-rotary head;
   a second comparator for comparing the signal level of an output signal from said third amplitude detector with the signal level of an output signal from said fourth amplitude detector;
   a third gate circuit for gating the output signal from said third amplitude detector in accordance with an output signal from said second comparator;
   a fourth gate circuit for gating the output signal from said fourth amplitude detector in accordance with said output signal from said second comparator;
   a second adder for adding an output signal from said third gate circuit to an output signal from said fourth gate circuit; and
   a first switch means for alternately selecting an output signal from said first adder and an output signal from said second adder on a field by field basis so as to thereby obtain a continuous reproduced signal;
   wherein lower level signal portions of the reproduced signal from said first main rotary head are replaced by the reproduced signal from said first sub-rotary head and lower level signal portions of the reproduced signal from said second main rotary head are replaced by the reproduced signal from said second sub-rotary head.

2. A video tape recording/reproducing apparatus according to claim 1, wherein: the azimuth angle of said first sub-rotary head is equal to that of said second main rotary head; the azimuth angle of said second sub-rotary head is equal to that of said first main rotary head; and a rotating plane of said sub-rotary heads is on a rotating plane of said main-rotary heads.

3. A video tape recording/reproducing apparatus according to claims 1 or 2, wherein a width of each of said sub-rotary heads is wider than that of each of said main rotary heads.

4. A video tape recording/reproducing apparatus according to claims 1 or 2, wherein a time lag of said signal reproduced by each of said sub-rotary heads with respect to said signal reproduced by each of said main rotary heads is compensated for by a video delay line.

5. A video tape recording/reproducing apparatus according to claims 1 or 2, wherein said signal reproduced by each of said sub-rotary heads compensates for said signal reproduced by each of said main rotary heads and is synchronized with a reproduced horizontal sync signal.

6. A video tape recording/reproducing apparatus according to claim 1, wherein: the azimuth angle of said first sub-rotary head is equal to that of said second main rotary head; the azimuth angle of said second sub-rotary head is equal to that of said first main rotary head; and a rotating plane of said sub-rotary heads differs by an even number of track pitches from a rotating plane of said main rotary heads.

7. A video tape recording/reproducing apparatus according to claim 6, wherein a width of each of said sub-rotary heads is wider than that of each of said main rotary heads.

8. A video tape recording/reproducing apparatus according to claim 6, wherein a time lag of said signal reproduced by each of said sub-rotary heads with respect to said signal reproduced by each of said main rotary heads is compensated for by a video delay line.

9. A video tape recording/reproducing apparatus according to claim 6, wherein said signal reproduced by each of said sub-rotary heads compensates for said signal reproduced by each of said main rotary heads and is synchronized with a reproduced horizontal sync signal.

10. A video tape recording/reproducing apparatus according to claim 1, wherein: the azimuth angle of said first sub-rotary head is equal to that of said first main rotary head; the azimuth angle of said second sub-rotary head is equal to that of said second main rotary head; and a rotating plane of said sub-rotary heads differs by an odd number of track pitches from a rotating plane of said main rotary heads.

11. A video tape recording/reproducing apparatus according to claim 10, wherein a width of each of said sub-rotary heads is wider than that of each of said main rotary heads.

12. A video tape recording/reproducing apparatus according to claim 10, wherein a time lag of said signal reproduced by each of said sub-rotary heads with respect to said signal reproduced by each of said main rotary heads is compensated for by a video delay line.

13. A video tape recording/reproducing apparatus according to claim 10, wherein said signal reproduced by each of said sub-rotary heads compensates for said signal reproduced by each of said main rotary heads and is synchronized with a reproduced horizontal sync signal.

* * * * *